(12) United States Patent
Bonte et al.

(10) Patent No.: US 10,689,781 B2
(45) Date of Patent: Jun. 23, 2020

(54) PROCESS AND SYSTEM OF DEBUNDLING FIBER TOW FOR USE IN PREFORM MATS AND MOLDING COMPOSITIONS CONTAINING SUCH FIBERS

(71) Applicant: Continental Structural Plastics, Inc., Auburn Hills, MI (US)

(72) Inventors: Philippe Bonte, Pouance (FR); Marc-Philippe Toitgans, Pouance (FR); Dominique Boyer, Pouance (FR); Michael Z. Asuncion, Auburn Hills, MI (US); Probir Kumar Guha, Bloomfield Hills, MI (US)

(73) Assignee: CONTINENTAL STRUCTURAL PLASTICS, INC., Auburn Hills, MI (US)

( * ) Notice: Subject to any disclaimer, the term of this patent is extended or adjusted under 35 U.S.C. 154(b) by 0 days.

(21) Appl. No.: 16/069,315

(22) PCT Filed: Jan. 25, 2017

(86) PCT No.: PCT/US2017/014853
§ 371 (c)(1),
(2) Date: Jul. 11, 2018

(87) PCT Pub. No.: WO2017/132211
PCT Pub. Date: Aug. 3, 2017

(65) Prior Publication Data
US 2019/0055680 A1    Feb. 21, 2019

Related U.S. Application Data

(60) Provisional application No. 62/287,355, filed on Jan. 26, 2016.

(51) Int. Cl.
*D02J 1/18* (2006.01)
*D01G 1/04* (2006.01)
(Continued)

(52) U.S. Cl.
CPC ............... *D02J 1/18* (2013.01); *B29B 7/905* (2013.01); *B29B 13/08* (2013.01); *B29C 70/12* (2013.01);
(Continued)

(58) Field of Classification Search
None
See application file for complete search history.

(56) References Cited

U.S. PATENT DOCUMENTS

| 2,958,919 A | 11/1960 | Palmer |
| 4,339,490 A | 7/1982 | Yoshioka et al. |

(Continued)

FOREIGN PATENT DOCUMENTS

| GB | 962817 A | 7/1964 |
| JP | 2010163536 A | 7/2010 |

(Continued)

OTHER PUBLICATIONS

Unal, M.F. and Rockwell, D., "On vortex formation from a cylinder. Part 1. The initial instability", Journal of Fluid Mechanics, May 1988, pp. 491-512, vol. 190, © 1988 Cambridge University Press; https://doi.org/10.1017/S0022112088001429.

(Continued)

*Primary Examiner* — Mary Lynn F Theisen
(74) *Attorney, Agent, or Firm* — Blue Filament Law PLLC

(57) ABSTRACT

A system for debundling fiber tow into chopped fibers is provided that has one or more reels of fiber tow, a cutting element configured to receive the fiber tow to form chopped fiber, and a tube with introduced gas flow configured to receive the chopped fiber. A moving belt is positioned under the tube to collect the chopped fiber. A dispenser is positioned along the moving belt for applying a binder or additive. A treatment chamber receives the treated chopped (Continued)

fiber. A process for debundling fiber tow into chopped fibers is provided that supplies one or more reels of fiber tow to a cutting system, drops the chopped fiber into a tube with introduced gas flow to debundle the chopped fiber with a vortex, collects the chopped fiber exiting the tube onto a moving belt, chemically treats the chopped fiber, and provides the chemically treated chopped to a treatment chamber.

20 Claims, 2 Drawing Sheets

(51) Int. Cl.
| | |
|---|---|
| B29C 70/50 | (2006.01) |
| B29C 70/12 | (2006.01) |
| D04H 1/413 | (2012.01) |
| D04H 1/4218 | (2012.01) |
| D04H 1/4242 | (2012.01) |
| D04H 1/44 | (2006.01) |
| D04H 1/64 | (2012.01) |
| D04H 1/732 | (2012.01) |
| D06M 10/02 | (2006.01) |
| B29B 13/08 | (2006.01) |
| C08J 5/00 | (2006.01) |
| B29B 7/90 | (2006.01) |
| C03C 25/6293 | (2018.01) |
| D06M 101/40 | (2006.01) |

(52) U.S. Cl.
CPC ........ *B29C 70/502* (2013.01); *C03C 25/6293* (2013.01); *C08J 5/00* (2013.01); *D01G 1/04* (2013.01); *D04H 1/413* (2013.01); *D04H 1/4218* (2013.01); *D04H 1/4242* (2013.01); *D04H 1/44* (2013.01); *D04H 1/64* (2013.01); *D04H 1/732* (2013.01); *D06M 10/025* (2013.01); *D06M 2101/40* (2013.01); *D10B 2101/06* (2013.01); *D10B 2101/12* (2013.01); *D10B 2505/02* (2013.01); *D10B 2505/12* (2013.01)

(56) References Cited

U.S. PATENT DOCUMENTS

| | | | |
|---|---|---|---|
| 4,849,147 | A | 7/1989 | Freeman |
| 5,352,110 | A | 10/1994 | Hayakawa et al. |
| 5,506,039 | A | 4/1996 | Kimura et al. |
| 5,518,577 | A | 5/1996 | Jinbo et al. |
| 5,565,049 | A | 10/1996 | Simmons et al. |
| 6,086,720 | A | 7/2000 | Bodary et al. |
| 6,148,641 | A | 11/2000 | Blough et al. |
| 6,182,332 | B1 | 2/2001 | Jander |
| 6,385,828 | B1 | 5/2002 | Kiss et al. |
| 6,901,986 | B2 | 6/2005 | Bradish |
| 7,691,223 | B2 | 4/2010 | Dahl et al. |
| 8,196,631 | B2 | 6/2012 | Dahl et al. |
| 8,616,110 | B2 | 12/2013 | Silva et al. |
| 9,149,834 | B2 | 10/2015 | Guha et al. |
| 9,421,548 | B2 | 8/2016 | Zhao et al. |
| 9,511,550 | B2 | 12/2016 | Mine et al. |
| 2006/0219346 | A1 | 10/2006 | Jander |
| 2010/0009159 | A1 | 1/2010 | Kimberly |
| 2015/0147543 | A1 | 5/2015 | Guha et al. |
| 2015/0247025 | A1 | 9/2015 | Ichikawa et al. |
| 2015/0315364 | A1 | 11/2015 | Ohtani et al. |
| 2016/0208061 | A1 | 7/2016 | Guha |
| 2016/0339669 | A1 | 11/2016 | Miyoshi et al. |
| 2016/0355976 | A1 | 12/2016 | Zhao |

FOREIGN PATENT DOCUMENTS

| | | |
|---|---|---|
| JP | WO2016039326 A1 | 4/2017 |
| JP | WO2016182077 A1 | 5/2017 |
| JP | WO2016208731 A1 | 6/2017 |
| JP | WO2017006989 A1 | 7/2017 |
| WO | 0026457 A1 | 5/2000 |
| WO | 2015084956 A1 | 6/2015 |
| WO | 2016162136 A1 | 10/2016 |

OTHER PUBLICATIONS

International Search Report dated May 4, 2017 for International Application No. PCT/US2017/014853 filed Jan. 25, 2017.
Extended European Search Report dated Oct. 15, 2019 for European Application No. 17744809 filed Jan. 25, 2017.

PROCESS AND SYSTEM OF DEBUNDLING FIBER TOW FOR USE IN PREFORM MATS AND MOLDING COMPOSITIONS CONTAINING SUCH FIBERS

RELATED APPLICATIONS

This application claims priority benefit of U.S. Provisional Application Ser. No. 62/287,355 filed Jan. 26, 2016; the contents of which are hereby incorporated by reference.

FIELD OF THE INVENTION

The present invention in general relates to a process and system for debundling fiber tow and in particular, to a process for producing chopped and disbursed fibers amenable to inclusion in performs mats and molding compositions.

BACKGROUND OF THE INVENTION

As a polymeric matrix of thermoset or thermoplastic with fiber reinforcement has attractive properties in terms of high strength to weight ratios. Sheet molding compositions (SMCs) have long been considered in automotive and aerospace applications as an alternative to metal body components. Similarly, thermoplastics with fiber reinforcements are able to meet performance requirements that could not be attained by thermoplastics absent such reinforcements. While there have been numerous attempts to develop models to create preforms, these have generally relied on a process of catching fibers from a slurry on a screen contoured in the shape of the desired preform, followed by a secondary drying to set the shape of the preform. Thermoplastic binders have been used in concert with heat to set the fibers in the preform shape. The preform is then subjected to optional trimming and impregnated with reactive resin through a reaction injection molding process to form a composite article. A molding technique is detailed, for example, in U.S. Pat. No. 4,849,147. A lifting screen preform mold process and apparatus is provided for example in U.S. Pat. No. 6,086,720.

To obtain reliable quality articles for automotive and other high stringency applications, it is important the fiber preforms and mats have piece-to-piece constituency and a uniform fiber density within various regions of the perform or mat. Typically, preforms tend to accumulate excess fibers proximal to edges while the center regions tend to be fiber deficient. This inhomogeneity in fiber density and also a degree of undesirable fiber preferential orientation are caused by fiber movement between contact with the preform mold screen and preform set of fiber position. While glass fibers are observed to have a nominal degree of fiber aggregation in a slurry that leads to the formation of an oriented clump of fibers being formed in a preform, these tendencies towards aggregation are more pronounced for other types of fibers such as carbon fibers and cellulosic-based fibers. While variant techniques have been explored, problems persist with slurry preform formation associated with limited throughput, and inhomogeneity of fiber densities within a preform.

The use of fiber inclusions to strengthen a matrix is well known to the art, and in the context of sheet molding composition (SMC) formulations and bulk molding composition (BMC) formulations; hereafter referred to collectively as "molding compositions", fiber strengthening has traditionally involved usage of chopped glass fibers. There is a growing appreciation in the field of molding compositions directed to replacing in part, or all, of the glass fiber in molding compositions with carbon fiber. However, this effort has met with limited success owing to differences between glass and carbon fibers. Specifically, these differences include fiber diameter with glass fibers used in molding compositions having typical diameters of between 16 and 30 microns while carbon fibers typically have diameters of between 2 and 10 microns. Additionally, whereas glass roving fabrics or bundles typically have tens to hundreds of individual fibers, carbon fiber tows typically come in bundles of thousands and even tens of thousands of individual fibers. A still further difference exists in the fiber-fiber interactions where glass fibers tend to scatter and debundle upon chopping, Van der Waals bonding and other inter-fiber surface interactions tend to make carbon fiber disinclined from debundling after chopping into desired lengths for use as reinforcement in a molding composition. While the debundling of carbon fiber tows is addressed in laboratory scale moldings through manual manipulation, problems exist for production scale debundling of carbon fiber tow into separate chopped carbon fibers.

Furthermore, difficulties have been encountered in producing mixed fiber resin matrix articles for the formation of a uniform layer of randomly oriented and intermixed glass fibers and carbon fibers. Similarly, the limited access to mixed fiber rovings and non-wovens has hampered efforts to reduce weight of vehicle body panels. Fibers for fiber reinforced resin molding are typically produced by chopping a tow formed of bundles of long fiber lengths into preselected lengths. While glass fibers are usually produced in tows of a few hundred fibers and cut cleanly to produce individual fibers, carbon fibers as stated previously have diameters of about 2 to 10 micrometers, much smaller than glass fibers with diameters of 10 to 25 micrometers, and are manufactured in tows that contain tens of thousands of fibers. Owing to physical and chemical differences carbon fibers tend to form clumps of fibers rather than randomly oriented, individual fibers commonly observed with glass fibers.

Thus, there exists a need for a process to debundle fiber tow into separated chopped fibers in a continuous manner to provide for an even distribution of fibers in a perform, mat, or molding composition to enhance the strength of a resulting SMC, BMC, thermoplastics, and a structure formed thereof. There further exists a need for a process and system that affords a homogenous layer of randomly oriented fibers across a desired lateral extent.

SUMMARY OF THE INVENTION

A system for debundling fiber tow into chopped fibers is provided that has one or more reels of fiber tow, a cutting element configured to receive the fiber tow to form chopped fiber from the one or more reels of fiber tow, and a tube with an introduced gas flow configured to receive the chopped fiber and to create a debundling vortex. A moving belt is positioned under the tube to collect the chopped fiber exiting the tube under gravity. A dispenser is positioned along the moving belt for applying a binder or an additive to the chopped fiber. A treatment chamber receives the treated chopped fiber.

A process for debundling fiber tow into chopped fibers as a mass on a moving belt for delivery to a treatment chamber is provided that supplies one or more reels of fiber tow to a cutting system to form chopped fiber, drops the chopped fiber into a tube with an introduced gas flow to debundle the chopped fiber with formation of a vortex, collects the chopped fiber exiting the tube on to the moving belt with gravity, chemically treats the chopped fiber from a dispenser above the moving belt, and provides the chemically treated chopped to the treatment chamber.

DETAILED DESCRIPTION OF THE INVENTION

Figure 1:
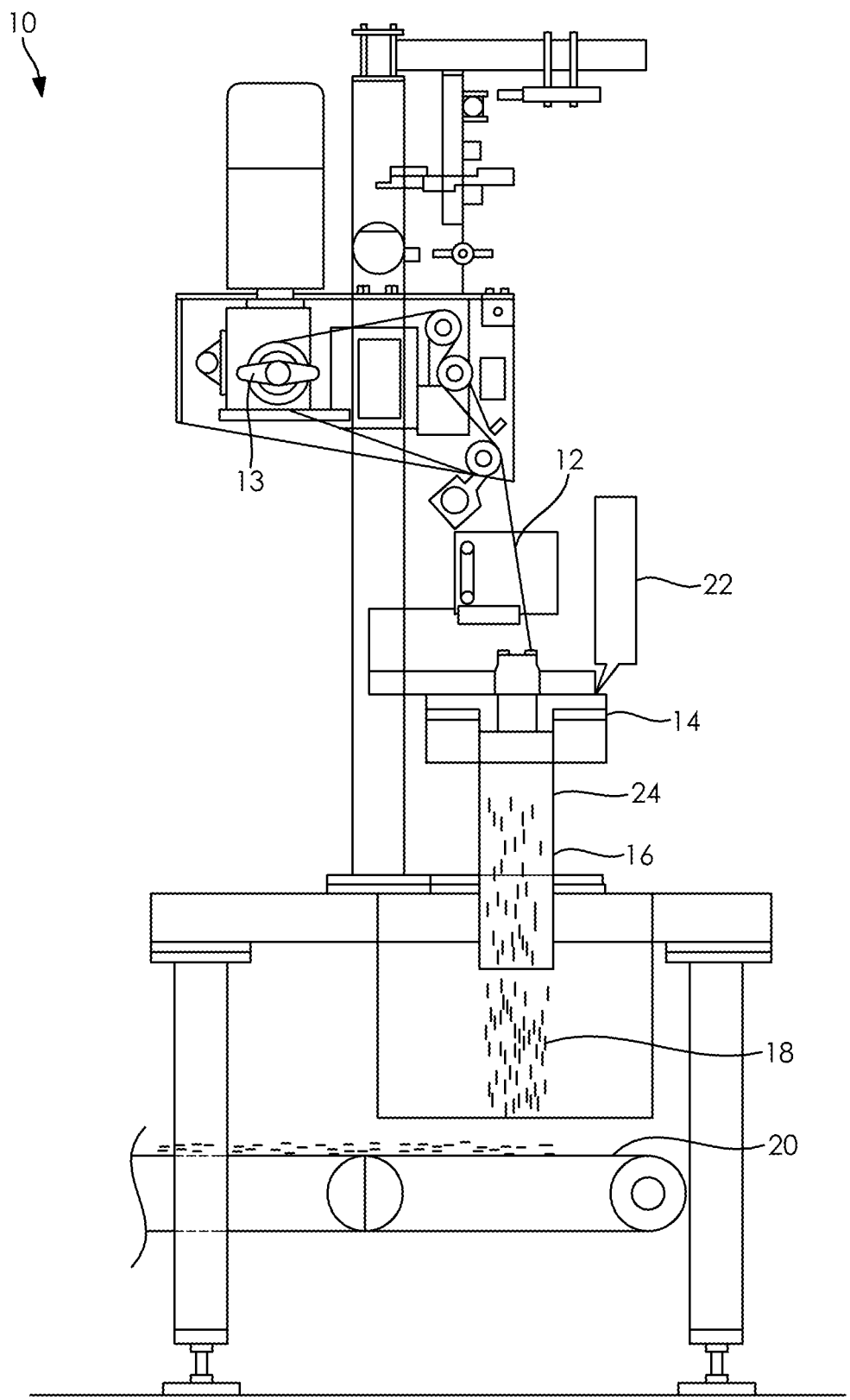
FIG. 1 is a cross sectional view of a fiber dosing and cutting machine according to the present invention operative in cutting and debundling fiber tow for disbursement in a perform mat or composite material.

The present invention has utility in debundling a large number of fibers collectively forming a tow into dispersed chopped fibers suitable for usage in molding composition formulations. According to the present invention, one or more fiber tow is fed into a fiber dosing and cutting machine where the chopped fibers are introduced into a downward airflow in a tubular tower that separates' and disperses the chopped fibers onto a moving belt.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

In certain inventive embodiments, the tow is a single carbon fiber; a single glass fiber tow, or a hybrid tow containing both glass and carbon fibers that is chopped and distributed. In still other inventive embodiments, multiple tows are simultaneously input, the multiple tows being carbon, glass, or a combination thereof. Typical lengths of chopped fibers used in the present invention typically range from 0.1 to 5 centimeters (cm). The diameters of fibers are appreciated to vary widely based on commercial sources with glass filler fibers having typical diameters of 0.03 to 0.5 millimeters (mm); carbon fibers having typical diameters of 0.005 to 0.1 mm. It should be appreciated that fiber dimensions outside of the aforementioned typical ranges exist and are intended to be within the scope of the present invention.

The tow or tows are subjected to a cutting element that divides the tow into preselected lengths of cylindrical bundles of fibers. The cutting element includes a variety of conventional blades including a spinning chopper blade, a liner actuated chopper blade, a water jet, and a laser cutter.

According to the present invention, chopped tow fibers are fed into a pressurized gas flow in a tube to induce a vortex of tumbling fibers. By controlling the time and rotation rate in the vortex, a desired degree of tow dispersion into small clusters of fibers, individual fibers or a combination thereof is obtained. The vortex formation dynamics are known to the art. M. F. Unal and D. Rockwell (1988). Journal of Fluid Mechanics, 190, pp 491-512. While the use of a cylinder as a tube is appreciated to offer advantages in terms of uniformity owing to the limited ability of swirling gas and fibers to form eddies therein and is uniform in vertical cross-section, it is appreciated that other tube shapes are also operative herein including spherical, hemispherical, conical, and polygonal cross-section shapes, where the cross-section is triangular, square, and higher order right polygons. Briefly, by directing a pressurized gas flow into a tube containing the chopped fibers with both rotary and vertical flow components, a vortex is formed. The dwell time of fibers in the cylinder can be extended to near infinite time by controlling the upward gas flow. In some embodiments, the tube itself is rotated as well to further enhance fiber debundling and mixing in the vortex.

Gases suitable for forming a vortex in a tube are limited only to compatibility with the fibers. Exemplary gases operative herein illustratively include air, nitrogen, carbon dioxide, carbon monoxide, hydrogen, noble gases, and a combination thereof. It is appreciated that in addition to debundling fibers, the tube is readily provided with electrodes, 24 in FIG. 1, to support an atmospheric pressure plasma to perform surface modification of the fibers during debundling. By way of example, surface functionality is added through plasma treatment during debundling or a fiber sizing is chemically modified to render the fiber more reactive toward a subsequently applied matrix. U.S. Pat. No. 9,149,834 is representative of such fiber modification.

In still other inventive embodiments, the gas flow entrains a stream of particulate fillers so as to form a debundled fiber mass that includes such filler particles interspersed therethrough. Particulate fillers that are entrained within such a gas flow illustratively include inorganic particles such as silica, carbon black, calcium carbonate, a hollow glass microspheres; synthetic organic particles such as polymeric beads of polystyrene and hollow polymeric beads; and naturally occurring particles such as ground shells and husks of plants such as coconut, rice hulls, walnut shells, egg shells; and combinations thereof. Particles for entrainment are provided in a particulate reservoir 22 in FIG. 1 that meters particulate into a gas stream passing thereby.

Regardless of whether chemical modification occurs in the tube, the debundled fibers are gravity fed onto an underlying belt with a generally random fiber orientation in the plane defined by the belt. It is appreciated that such debundled fibers will tend to lay in the plane of the belt on initial deposition, defined by a zero degree angle relative to the belt plane, yet as the thickness of a layer of fibers builds on the belt, the average fiber angle of incline relative to the belt increases to values from greater than 0 to 60 degrees.

By sizing the tube relative to the width of the belt, a lateral distribution of fibers is obtained that varies by less than 20 fiber number percent across the width of the chopped fiber mass on the belt in some inventive embodiments. While in other inventive embodiments, the lateral distribution of fibers is less than 10 fiber number percent. It is appreciated that with resort to an inward angled rail, relative to the direction of movement of the belt, the fibers at the edges of the belt are preferentially urged inward to create a narrower lateral width of fibers on the belt, but a width that is more uniform. In some embodiments the tube is pivoted side to side relative to the direction of belt movement to vary the lateral distribution of chopped fibers on the belt.

The debundled fibers in some embodiments are chemically treated either within the tube or on the belt. Chemical treatments operative herein illustratively include silanes, silisequioxanes (SQs), and combinations thereof. It is appreciated that chemical treatments in some embodiments are accomplished with heating, actinic radiation, or plasma to promote bond formation between the additive and the fiber.

In some embodiments of the present invention, particulate filler is applied as a layer at this point in the belt transit. The particulate fillers including the aforementioned materials.

A binder is then sprayed on the chopped fiber mass. It is appreciated that the fiber mass in some inventive embodiments is compressed prior to spray application of the binder. The binder is applied neat or a suspension or solvate in a solvent. Binders operative herein illustratively include latexes, epoxies, phenolic resins, and polyesters; and combinations thereof. It is appreciated that binder spray in some embodiments are accomplished with heating, actinic radiation, or plasma to promote bond formation between the binder and the fiber.

Embodiments of the present invention provide an improved fiber dispersion in terms of lateral uniformity, randomness in the plane of the belt, inclusion of particulate therein, debundling, or a combination of any of the aforementioned as compared to existing processes. The control of fiber properties and the continuous production process to produce a binder retained fiber mass according to the present invention is then available in certain embodiments to be dispersed in molding composition formulations prior to formulation cure, as well as for use in perform mats for use in composite molds illustratively including SMC and resin transfer molding (RTM). Preform mats formed by the inventive process and system are available for thermoset resin composition molding that upon cure form a variety of molded and fiber reinforced articles. Such articles are used in a variety of applications such as vehicle components such as bed liner, body components, trim, interior components, and undercar components; architectural components such as trim and doors; marine components as hulls, trim, and cockpit pieces; and similar structures in aerospace settings.

Figure 2:
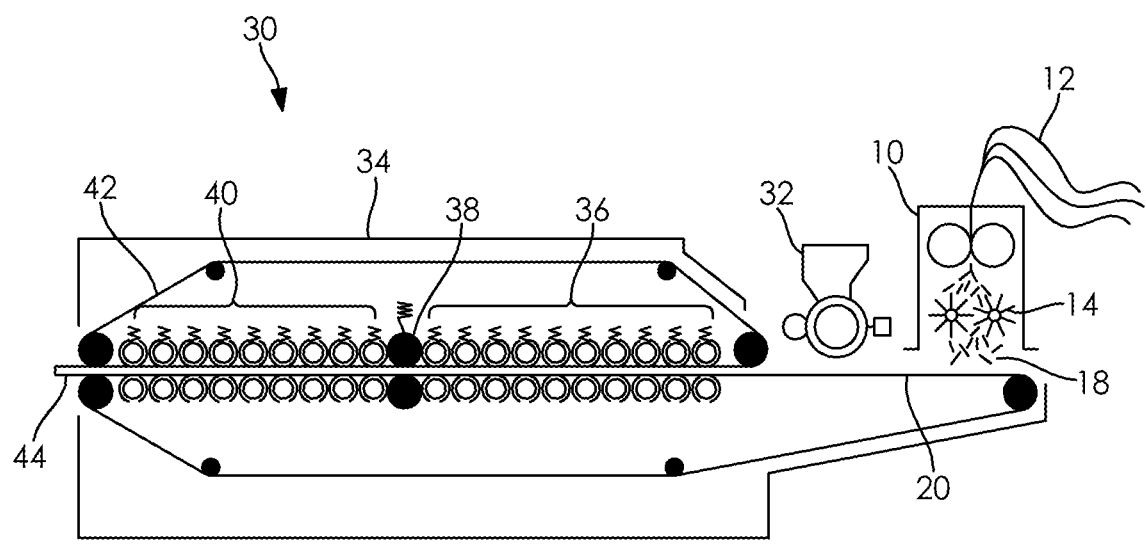
FIG. 2 is a cross sectional view of a system for producing a chopped fiber perform mat with the fiber dosing and cutting machine shown in FIG. 1 in accordance with embodiments of the invention.

Referring now to figures where like numerals correspond to the meanings ascribed thereto between figures, in FIG. 1 a cross sectional view of a fiber dosing and cutting machine is shown generally at 10. One or more fiber tows 12 is fed from feeder reels 13 into a cutting element 14 as detailed above for chopping the tow. The one or more fiber tows may be the same material, or the tows may be a mixture of glass, carbon, natural, and chemical based tows. The chopped fibers are dropped downward through a tube 16 under helical gas flow in a vortex to separate and disperse chopped fibers 18 on to a moving belt 20. The tube 16 in some embodiments includes a plasma generation electrode set (not shown). As shown in the system view 30 in FIG. 2, the chopped fibers 18 exiting from the fiber dosing and cutting machine 10 and on to the moving belt are coating with a binder applied from a dispenser 32. The nature of the binder having been detailed above. It is appreciated that a similar dispenser to dispenser 32 is used to dispense a chemical additive prior to, or subsequent to the binder dispenser 32. Such additives include the aforementioned. While not shown for visual clarity, the application of a binder or an additive each independently is accompanied with an activation energy input such as a thermal source, a light source, or a plasma source. The treated fibers are then moved into a treatment chamber 34 where the fibers are pressed with rollers 38 between the moving belt 20 and an upper moving belt 42 into a sheet or mat 44. The treatment chamber has a first heating section 36 that cures the chemically treated fibers 20, and a second cooling section 40 prior to the exit of the sheet or mat from the chamber 34. It is appreciated that the atmosphere in chamber sections 36 and 40 are each independently controlled at illustratively include air or inert gases of a preselected temperature.

The present invention is further detailed with respect to the following non-limiting example. This example is not intended to limit the scope of the appended claims.

EXAMPLES

Example 1

In a specific inventive embodiment, the fiber dosing and cutting machine may have adjustable fiber cutting lengths with one to four knife blades, with fiber widths of up to 500 mm with 4 blades. The fiber feed rate may be set up to 240 m/min, with a rotation speed of 12,000 r.p.m. An exemplary chopping system machine commercially available. The machine is modified with a vortex forming chamber and an underlying conveyor as shown schematically in FIG. 2.

The invention claimed is:

1. A system for debundling fiber tow into chopped fibers comprising:
   one or more reels of fiber tow;
   a cutting element configured to receive the fiber tow to form chopped fiber from the one or more reels of fiber tow;
   a tube with an introduced gas flow configured to receive the chopped fiber and to create a debundling vortex;
   a moving belt positioned under the tube to collect the chopped fiber exiting the tube under gravity;
   a dispenser positioned along the moving belt for treating the chopped fiber by applying a binder or an additive to the chopped fiber; and
   a treatment chamber that receives the treated chopped fiber.

2. The system of claim 1 wherein the one or more reels of fiber tow are at least one of glass; carbon; polyimides; polyesters; or polyamides, and combinations thereof.

3. The system of claim 1 wherein the tube further comprises a plasma generator.

4. The system of claim 1 wherein the dispenser includes the binder.

5. The system of claim 1 further comprising a particulate reservoir in fluid communication with the gas flow.

6. The system of claim 1 further comprising a rail angled inward relative to a direction of movement of the moving belt to urge some of the chopped fiber toward a center line of the moving belt.

7. The system of claim 1 further comprising a source of thermal actinic, or plasma energy associated with the dispenser to promote a chemical reaction between the binder or the additive and the chopped fiber.

8. The system of claim 1 wherein the treatment chamber further comprises a set of rollers to flatten the treated chopped fiber on the moving belt.

9. The system of claim 1 wherein the treatment chamber further comprises a first heating section that cures the treated chopped fibers, and a second cooling section prior to the exit of the preform mat from the treatment chamber.

10. The system of claim 1 wherein the treatment chamber further comprises an upper moving belt.

11. The system of claim 1 wherein the cutting element further comprises a series of blades.

12. A process for debundling fiber tow into chopped fibers as a mass on a moving belt for delivery to a treatment chamber comprising:
    supplying one or more reels of fiber tow to a cutting system to form chopped fiber;
    dropping the chopped fiber into a tube with an introduced gas flow to debundle the chopped fiber with formation of a vortex;
    collecting the chopped fiber exiting the tube on to the moving belt with gravity;

chemically treating the chopped fiber from a dispenser above the moving belt; and providing the chemically treated chopped fiber to the treatment chamber.

13. The process of claim 12 wherein the introduced gas flow applies rotary and vertical components to the chopped fibers.

14. The process of claim 12 further comprising applying a plasma discharge in the tube.

15. The process of claim 12 further comprising entraining particulate in the gas flow.

16. The process of claim 12 further comprising applying an energy source of heat, actinic radiation of plasma to promote binder adhesion to the chopped fiber.

17. The process of claim 12 wherein the chemically treated chopped fiber exits the treatment chamber as a preformed mat.

18. The process of claim 12 further comprising flattening the chemically treated chopped fiber on the moving belt.

19. The process of claim 12 further comprising heating the chemically treated chopped fibers in a first section of the treatment chamber, and then cooling the chemically treated chopped fiber relative to the first section.

20. The process of claim 12 further comprising pressing into a sheet or mat the chemically treated chopped fiber in the treatment chamber with rollers between the moving belt and an upper moving belt.

* * * * *